United States Patent Office

3,060,223
Patented Oct. 23, 1962

3,060,223
PREPARATION OF DIHYDROXYETHYL
TEREPHTHALATE
Aubrey R. McKinney, Whiting, Ind., assignor to Standard Oil Company, Chicago, Ill., a corporation of Indiana
No Drawing. Filed Mar. 17, 1960, Ser. No. 15,551
2 Claims. (Cl. 260—475)

This invention relates to the preparation of bisglycollates of phthalic acids and particularly bisglycollates of terephthalic acid suitable for the production of polymers.

It is usual to prepare bisglycollate of phthalic acids by an interchange reaction between the methyl or ethyl ester of the phthalic acid and the particular glycol desired. It is apparent that considerable advantage in cost exists for the direct preparation of such bisglycollates of phthalic acid.

It has been found that bisglycollates of phthalic acids suitable for use as intermediates for polymers can be prepared by the direct reaction of a glycol and the phthalic acid in the presence of a catalytically effective amount of manganous acetate.

The phthalic acids which are suitable for use in the method of the invention include orthophthalic acid, isophthalic acid, and terephthalic acid. Also, substituted phthalic acids wherein the substituents do not introduce steric hindrance problems. The chlorophthalic acids are particularly suitable acids containing substituents other than the carboxyl groups.

The method of the invention utilizes glycols containing from 2 to about 15 carbon atoms. These glycols may be the simple glycols or the ether glycols. Also, the term glycol includes the alicyclicdihydric alcohols. Illustrations of suitable glycols are: ethylene glycol, propylene glycol, 1,4-butanediol, 1,6-hexanediol, 2-ethyl-1,3-hexanediol, diethylene glycol, triethylene glycol, tetraethylene glycol, dipropylene glycol, tripropylene glycol, cyclohexanediol, 1,4-cyclohexanedimethanol, and 1,3-cyclohexanedimethanol.

The bisglycollate is prepared by contacting the phthalic acid and the glycol in a mole ratio of glycol to acid of at least about 2. Larger amounts of glycol are preferred; usually the ratio is about 3–12. Larger amounts of glycol may be used with advantage in some instances.

The method is carried out by contacting the phthalic acid and the glycol at an elevated temperature suitable for carrying out the reaction in a reasonable time. In general, the reaction zone is maintained at a temperature from about 200° C. to about 350° C. The particular temperature used will be dependent upon the particular glycol used and the reaction rate desired. When utilizing the lower boiling glycols, the temperature is generally between about 250° C. and 275° C.

Since maximum yields of bisglycollate are desired, the contacting is continued until equilibrium conversion has been reached or substantially all of the phthalic acid has reacted. The particular time needed for the particular combination of glycol and acid is readily determined by a small number of trial runs. When operating with the lower boiling glycols such as ethylene glycol or propylene glycol, the time will vary from about 15 minutes to about 2 hours—the longer times corresponding to the lower temperatures. When operating in the usual preferred temperature range of 250–275° C., the time will be about 30–90 minutes.

The direct esterification is accomplished in the presence of a catalytically effective amount of manganous acetate. The manganous acetate used should be in an essentially anhydrous condition. This is readily accomplished by drying the hydrate form sold in commerce under vacuum at a temperature of about 100° C. In general, the catalyst is present in an amount from about 0.01 to about 0.5 weight percent based on the amount of glycol present in the reaction zone. When polymerization is carried out without separation of the manganous acetate from the bisglycollate product, it is desirable to keep the catalyst usage to a minimum, usually below about 0.1 percent. When operating with the lower boiling glycols, it is preferred to have present about 0.05–0.1 weight percent of manganous acetate.

The method of the invention is illustrated by working examples on the preparation of 1,4 bis(hydroxyethyl)-terephthalate by the direct reaction of ethylene glycol and terephthalic acid.

*Example 1*

One gram of terephthalic acid and 4.48 grams of ethylene glycol (12/1 ratio, mols glycol/TA) containing 0.1% manganous acetate (based on glycol), were sealed in a glass tube and heated with agitation for one hour at 260° C. The terephthalic acid was found by analysis to be 97.7% esterified. (Under the same conditions without catalyst conversion was 84.2%.)

*Example 2*

A mixture containing ten grams of terephthalic acid and 44.8 g. of ethylene glycol (12/1 ratio) containing 0.1% manganous acetate (based on glycol) was sealed in a Fischer-Porter stirred pressure assembly and heated with stirring for one hour at 260° C. A maximum pressure of 40 p.s.i. was developed. The terephthalic acid was found by analysis to be 98.9% esterified.

*Example 3*

Under the identical conditions of Example 1 above, a run was made utilizing as the catalyst a mixture of zinc oxide and antimony oxide—equal parts by weight. In this run, the conversion of terephthalic acid was 90.4%.

*Example 4*

Another run was made under the conditions of Example 1 except that 0.2 weight percent of the zinc oxide-antimony oxide mixture was used as the catalyst. In this run, the conversion of terephthalic acid was 90.9%.

The above data show that manganous acetate produces essentially complete reaction of the terephthalic acid under these conditions. Also, that the zinc oxide-antimony oxide mixture, which is extremely effective for the direct esterification of terephthalic acid and methanol, is not as effective as the manganous acetate in the production of bisglycollate by direct reaction of acid and glycol.

*Example 5*

A mixture containing 10 g. terephthalic acid and 10.9 g. ethylene glycol (3/1 ratio) containing 0.1% manganous acetate (based on glycol) was sealed in a Fischer-Porter assembly and heated for one hour at 260° C. under 35 pounds nitrogen pressure. Pressure was then released, excess glycol distilled off and the mixture heated at 0.5 mm. pressure and 260° C. for two hours. The resultant white polymer melted at 264° C., could be cold drawn and had an intrinsic viscosity of 0.46.

Thus having described the invention, what is claimed is:

1. A method of making 1,4 bis(hydroxyethyl)terephthalate which method comprises contacting ethylene glycol and terephthalic acid, in a mole ratio of said glycol to said acid of about 3–12, at a temperature of about 260° C., for a time of about 30–90 minutes, in the presence of about 0.05–0.1 weight percent of manganous acetate.

2. A method of preparing a bisglycollate of an unsubstituted phthalic acid, which method comprises contacting an unsubstituted phthalic acid and ethylene glycol, in a mole ratio of glycol to acid of at least about 2, at a temperature from about 200° C. to about 350° C., for a time such that substantially all of said acid is reacted, and said contacting being in the presence of from about 0.01 to 0.5 weight percent of manganous acetate, based on said glycol.

References Cited in the file of this patent

UNITED STATES PATENTS 2,828,290   Caldwell _____ Mar. 25, 1958

FOREIGN PATENTS

| | | |
|---|---|---|
| 577,788 | Canada | June 16, 1959 |
| 742,196 | Great Britain | Dec. 21, 1955 |
| 753,880 | Great Britain | Aug. 1, 1956 |
| 769,220 | Great Britain | Mar. 6, 1957 |
| 819,640 | Great Britain | Sept. 9, 1959 |

OTHER REFERENCES

Hackh's Chemical Dictionary (Phila., 1944), p. 383.